Jan. 7, 1936. M. E. HANSON 2,027,097
AIR CONDITIONING SYSTEM
Filed Oct. 2, 1934 2 Sheets-Sheet 1
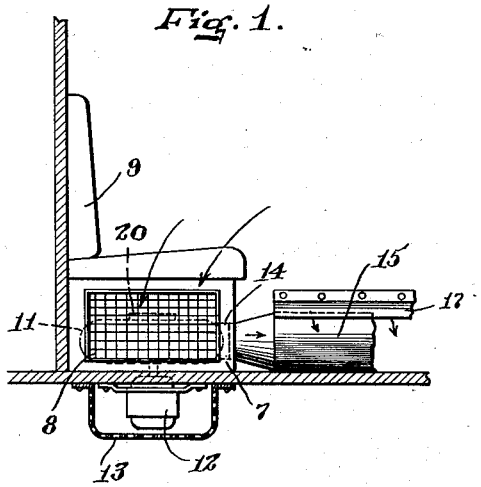
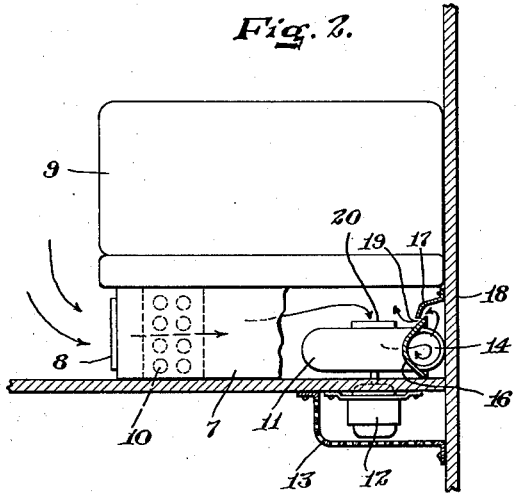
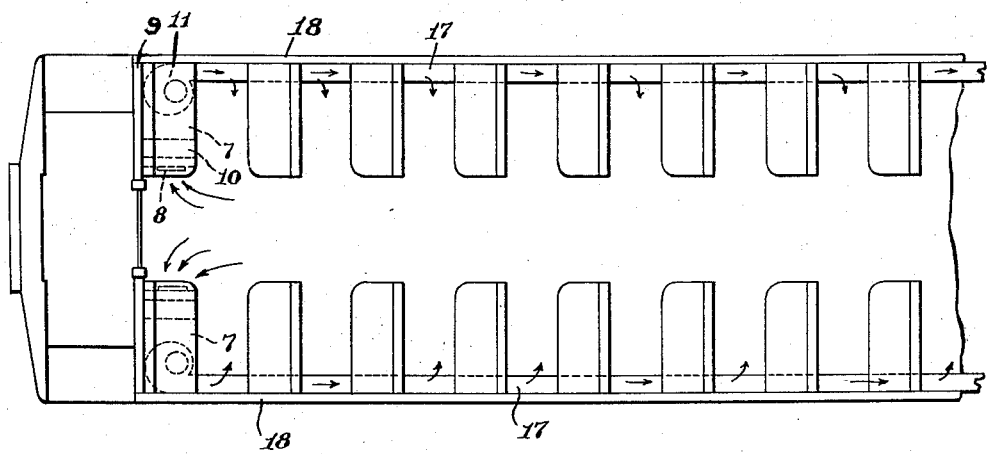
INVENTOR.
MILTON E. HANSON.
BY Robert T. Palmer
ATTORNEYS.

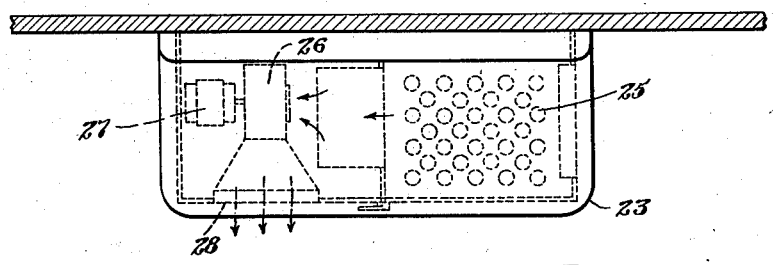
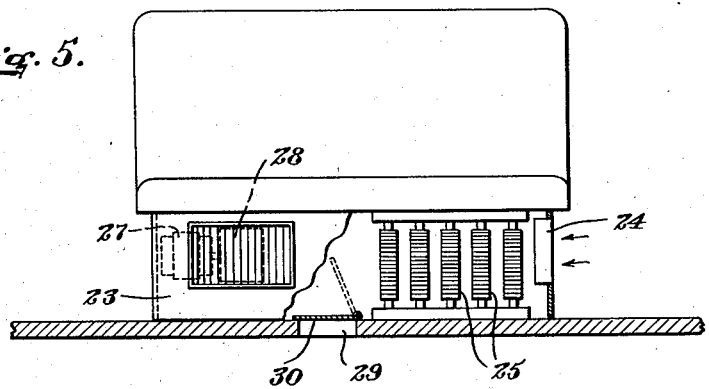
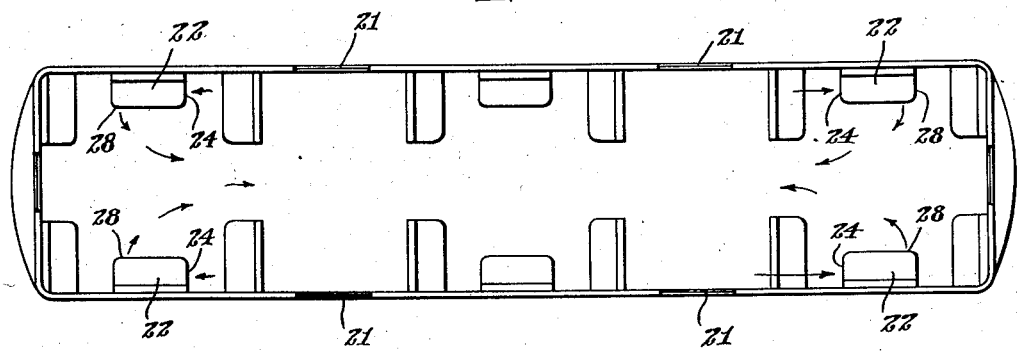

Patented Jan. 7, 1936

2,027,097

UNITED STATES PATENT OFFICE 2,027,097

AIR CONDITIONING SYSTEM

Milton E. Hanson, Collingswood, N. J., assignor to B. F. Sturtevant Company, Inc., Hyde Park, Boston, Mass.

Application October 2, 1934, Serial No. 746,617

1 Claim. (Cl. 257—7)

This invention relates to the air conditioning of passenger vehicles, and relates more particularly to methods and apparatus for the cooling or heating of and the distribution of air in what are known as rapid transit cars, such as subway, elevated, street, and interurban cars.

In the past, practically all of the rapid transit type cars have been energized from an electrical source, and the passenger space has been heated by electric resistance coils placed under or adjacent the car seats, the only air circulation being thermal, no fans or blowers being associated with the sources of heat. Such installations have been unsatisfactory due to uneven heat distribution and to improper ventilation.

At the present time, it is proposed to drive many interurban cars by internal combustion engines of the Diesel type. With cars utilizing such a drive, it is not convenient to heat the air by the usual arrangement of electrical resistance coils, and, accordingly, it has become necessary to devise new heating arrangements which will not only heat but will cool the air supplied to the passenger space, yet which may be so placed as not to occupy any of the useful space within the car. It is also desirable, for reasons of economy in manufacture and operation, to provide air conditioning apparatus for interurban cars which may be used with either the electrically driven or the Diesel engine driven type.

According to this invention, air supplied to rapid transit type cars is cooled or heated as desired. The air from the passenger space is recirculated, mixed with the proper amount of fresh air, and, after conditioning, is forced under pressure into the passenger space by compact, efficient apparatus mounted completely under end seats in each individual car.

One embodiment of the invention has been designed particularly for the interurban type cars, which may be driven electrically or may be driven by an internal combustion engine. In this type of car, the passenger seats are arranged similarly to those in well known railway passenger cars, there being two rows of seats arranged the length of the car with an aisle therebetween. In this embodiment of the invention, the air conditioning apparatus is preferably arranged in two units, one under each of the two end seats in one end of the car, one being on each side of the car. Each unit has an outlet connected to a longitudinal supply duct which is arranged along the floor line, the air being discharged between adjacent seats and from each side of the car, circulation being set up by recirculating the air overhead and into recirculating air inlets in the units, where sufficient outside air is also blown to provide comfortable conditions.

Another embodiment of the invention has been designed particularly for the subway or elevated type of rapid transit cars, where fewer seats and more standing room is provided than in the other type of rapid transit cars. In this embodiment of the invention, four air conditioning units are preferably provided, one adjacent each corner of the car, no ducts being used, and each unit discharging cooled or heated air directly into the passenger space and towards the other units, positive circulation being insured by a fan or blower forming a part of each unit.

An object of this invention is to provide conditioned air from units mounted beneath one or more seats of a passenger vehicle.

Another object of the invention is to provide efficient, compact air conditioning apparatus which may be mounted beneath a seat of a passenger vehicle.

Another object of the invention is to provide, in a passenger vehicle, a plurality of air conditioning units mounted beneath the seats of the vehicle and cooperating so as to provide adequate and proper air distribution.

Other objects of the invention will be apparent from the following description, taken together with the drawings.

The invention will now be described with reference to the drawings, of which:

Fig. 1 is an end view of an end seat in an interurban type passenger car, showing the arrangement of air conditioning apparatus beneath the seat, together with a portion of the longitudinal air supply duct;

Fig. 2 is a front view, with portion removed, of the seat and apparatus of Fig. 1;

Fig. 3 is a plan view, with top removed, looking downwardly upon an interurban type car equipped with the air conditioning apparatus of Figs. 1 and 2 under the end seats in one end of the car;

Fig. 4 is a plan view looking downwardly upon a seat in a subway or elevated type of rapid transit car, showing the air conditioning apparatus mounted underneath the seat, in dotted outline;

Fig. 5 is an elevation view, with portion removed, of the seat of Fig. 4, and

Fig. 6 is a plan view, with top removed, looking downwardly upon a car having the air conditioning arrangement of Figs. 4 and 5 mounted under a seat adjacent each corner of a passenger car.

The unit 7, shown by Figs. 1 and 2, is mounted completely underneath the car seats. The recirculated air inlet 8 to the unit 7 is arranged adjacent that end of the seat 9 which is furtherest from the longitudinal side of the car and which borders upon the car aisle. Within the unit 7, and adjacent the recirculated air inlet 8, are the extended surface heat exchange coils 10, through which a heating medium may be circulated in winter, and through which a cooling medium may be circulated in summer. Arranged within the unit 7 and adjacent the longitudinal side of the car is the blower 11, which is driven by the electric motor 12. The motor 12 is mounted beneath the car floor and is protected by the bracket 13, which is perforated to permit cooling of the motor. The outlet opening 14 of the motor opens to the duct 15, which is arranged longitudinal of the car to extend the entire length thereof. The duct 15 comprises the portion 16, the lower end of which is so mounted along the car floor that no air can escape therefrom at its lower portion. The upper portion has placed above it the confining flange 17, which has one end attached to the longitudinal wall 18 of the car, and which, at its other end provides a narrow opening or slot 19 which extends the length of the car.

In operation, recirculated air is drawn in through the recirculated air inlet 8, passes over the heat exchange coils 10, is drawn in through the inlet 20 of the blower 11, is discharged from the outlet 14 of the motor into the duct 15, where a substantial static pressure is built up, due to the fact that the duct is sealed except for the narrow slit extending its length. The same static pressure extends within the duct its entire length, and the air is discharged uniformly and at relatively high velocity through the slot 19 into the passenger space.

In one successful installation of this embodiment of the invention, in an interurban car which was driven by a Diesel engine, the jacket cooling water of the engine was circulated through the coils 10 on the way to the radiator, the heated water thus serving to heat the air during cold weather. In summer operation, ice water from an ice bin mounted on the under side of the car may be circulated through the coils 10 or refrigeration may be supplied from refrigeration apparatus associated with the car equipment.

Although the conditioned air is discharged at high velocity through the narrow slot 19 between the seats of the car, the volume of the air between each space is relatively small so that no unpleasant effects are observed by passengers within the car. The conditioned air passes through the passenger area, then rises, and is returned along the upper portion of the car to th recirculated air inlets by the suction action of the blowers 11.

In the embodiment of the invention illustrated by Figs. 4 to 6 inclusive, the provision of the plurality of side doors 21 prevents the use of the air distribution arrangement described in connection with Figs. 1 to 3, and so, in order to obtain adequate air conditioning effect and distribution in this type of car, it was decided to use four units, one under each of the transverse seats 22, which are usually provided in cars of this type. Each unit, indicated generally by 23, comprises the recirculated air inlet opening 24, the heat exchange coils 25, the blower 26, driven by the electric motor 27, and the discharge outlet 28. An outside air inlet opening 29 extends to the unit from underneath the car and through the car floor, and this opening may be closed or opened at will by means of the damper 30. This opening for the intake of outside air is provided during those times when no cooling or heating effect is required, in which case the heat exchange coils 25 are not operated, the damper 30 is manipulated to open the opening 29, and the blower 26 is operated to indraw into the car and circulate therethrough fresh air.

As described in connection with the first embodiment of the invention, the heating medium may be circulated through the coils 25 in winter, and the cooling medium may be circulated through the coils in summer. In those climates, or under conditions where no cooling is required, the coils 25 may be of the ordinary electrical resistance type.

In operation, the air discharged from the four units mounted under the seats 22 is forced crossways, lengthwise the car as shown by the arrows in Fig. 6, the conditioned air being discharged through the outlets 28 into the passenger space, the conditioned air afterwards rising to the top of the car, where it returns to the units and is drawn down into the recirculated air inlet openings 24 under the suction action of the blower 26.

Whereas several embodiments of the invention have been described for the purpose of illustration, it should be understood that the invention is not limited to the details described, since many modifications may be made by those skilled in the art without departing from the spirit of the invention.

What is claimed is:

Air conditioning apparatus for a railway passenger car, comprising a pair of air conditioning units, one of said units being mounted completely under a seat and in one corner of one end of said car, and the other of said units being mounted completely under a seat in the opposite corner of the same end of said car, said units having recirculated air inlets facing the aisle of said car and placed opposite each other, a fan, and a heat exchange surface within each of said units, a pair of longitudinal distribution ducts arranged along the floor line, each along one longitudinal side of said car, and a discharge outlet in each of said units connected each to one of said ducts.

MILTON E. HANSON.